United States Patent
Bilde

(10) Patent No.: US 9,717,183 B2
(45) Date of Patent: Aug. 1, 2017

(54) GRAIN CLEANING UNIT WITH CLEANING AIRSTREAM VENTED ABOVE GRAIN PAN FOR A COMBINE HARVESTER

(71) Applicant: AGCO A/S, Hesston, KS (US)

(72) Inventor: Morten Leth Bilde, Langaa (DK)

(73) Assignee: AGCO A/S, Randers (DK)

( * ) Notice: Subject to any disclaimer, the term of this patent is extended or adjusted under 35 U.S.C. 154(b) by 75 days.

(21) Appl. No.: 14/442,478

(22) PCT Filed: Nov. 19, 2013

(86) PCT No.: PCT/EP2013/074124
§ 371 (c)(1),
(2) Date: May 13, 2015

(87) PCT Pub. No.: WO2014/082890
PCT Pub. Date: Jun. 5, 2014

(65) Prior Publication Data
US 2016/0270295 A1    Sep. 22, 2016

(30) Foreign Application Priority Data
Nov. 28, 2012   (GB) .................................. 1221347.6

(51) Int. Cl.
*A01F 12/48*    (2006.01)
*B07B 1/55*    (2006.01)
(Continued)

(52) U.S. Cl.
CPC .............. *A01F 12/444* (2013.01); *A01F 7/04* (2013.01); *A01F 12/448* (2013.01); *A01F 12/48* (2013.01)

(58) Field of Classification Search
CPC ...... A01F 12/444; A01F 12/44; A01F 12/446; A01F 12/30; A01D 41/1256; A01D 75/282
(Continued)

(56) References Cited

U.S. PATENT DOCUMENTS 2,937,647 A    5/1960 Allen et al.
3,603,063 A *  9/1971 Stroburg ............... A01F 12/444
                                                   460/109
(Continued)

FOREIGN PATENT DOCUMENTS

DE    3228326 A    2/1984
EP    0077416 A1   4/1983
(Continued)

OTHER PUBLICATIONS

Eurpoean Receiving Office; International Search Report for International Patent Application No. PCT/EP2013/074124, mailing date Feb. 13, 2014.
(Continued)

*Primary Examiner* — Árpád Fábián-Kovács

(57) ABSTRACT

A combine harvester includes threshing apparatus, a grain pan and a cleaning unit. The grain pan is arranged to collect a grain/chaff stream from the threshing apparatus and is driven in an oscillating manner to convey the collected grain/chaff to a rear edge from where the grain/chaff stream falls into the cleaning unit. The cleaning unit includes a fan unit for generating an airstream directed through the grain/chaff stream falling from the rear edge and an airstream vented above the grain pan.

13 Claims, 8 Drawing Sheets

(51) Int. Cl.
    *B08B 5/00*     (2006.01)
    *A01F 12/44*     (2006.01)
    *A01F 7/04*     (2006.01)

(58) Field of Classification Search
    USPC .......................................... 460/99, 100, 101
    See application file for complete search history.

(56) References Cited

U.S. PATENT DOCUMENTS

| | | | | | |
|---|---|---|---|---|---|
| 3,800,804 | A | * | 4/1974 | Boone | A01F 12/444 415/53.3 |
| 3,833,006 | A | * | 9/1974 | Temple | A01F 12/444 415/148 |
| 4,007,744 | A | * | 2/1977 | Shaver | A01F 12/442 209/134 |
| 4,307,732 | A | * | 12/1981 | De Busscher | A01F 12/444 209/318 |
| 4,353,376 | A | * | 10/1982 | Schuler | A01F 12/44 460/67 |
| 4,465,082 | A | * | 8/1984 | Strubbe | A01F 12/442 460/98 |
| 4,589,425 | A | * | 5/1986 | Mitchell, Jr. | A01F 12/444 460/99 |
| 4,627,446 | A | * | 12/1986 | Huhman | A01F 12/44 460/74 |
| 5,098,341 | A | * | 3/1992 | Kuchar | A01F 12/444 460/99 |
| 5,387,154 | A | | 2/1995 | Peters | |
| 5,428,945 | A | * | 7/1995 | von Allworden | A01F 12/444 460/98 |
| 5,558,576 | A | * | 9/1996 | Meyers | A01F 12/444 460/100 |
| 5,624,315 | A | * | 4/1997 | Jonckheere | A01F 12/444 460/100 |
| 5,795,223 | A | * | 8/1998 | Spiesberger | A01F 12/448 460/102 |
| 6,773,343 | B2 | * | 8/2004 | Grywacheski | A01F 12/446 460/100 |
| 7,399,223 | B2 | * | 7/2008 | Weichholdt | A01F 12/446 209/395 |
| 7,670,219 | B2 | * | 3/2010 | Matousek | B60B 35/163 460/100 |
| 8,608,534 | B1 | * | 12/2013 | Stahl | A01F 12/444 460/99 |
| 8,821,229 | B2 | * | 9/2014 | Stan | A01F 12/444 460/99 |
| 8,968,065 | B2 | * | 3/2015 | Bilde | A01F 12/30 460/90 |
| 9,033,779 | B2 | * | 5/2015 | Hillen | A01F 12/444 460/99 |
| 9,295,197 | B1 | * | 3/2016 | Veikle | A01D 61/04 |
| 9,345,197 | B2 | * | 5/2016 | Biggerstaff | A01F 7/04 |
| 2002/0037758 | A1 | * | 3/2002 | Visagie | A01F 12/444 460/99 |
| 2002/0086722 | A1 | * | 7/2002 | Kuhn | A01D 41/1243 460/100 |
| 2004/0226275 | A1 | * | 11/2004 | Baumgarten | A01D 41/1276 56/153 |
| 2005/0137003 | A1 | * | 6/2005 | Behnke | A01D 41/1276 460/1 |
| 2006/0229119 | A1 | * | 10/2006 | Wamhof | A01D 75/282 460/101 |
| 2006/0281506 | A1 | | 12/2006 | Weichholdt | |
| 2013/0116018 | A1 | * | 5/2013 | Ricketts | A01D 75/282 460/9 |
| 2014/0080554 | A1 | * | 3/2014 | Bilde | A01F 12/30 460/73 |

FOREIGN PATENT DOCUMENTS

| | | |
|---|---|---|
| EP | 0144291 A2 | 6/1985 |
| EP | 0683970 A2 | 11/1995 |
| GB | 2452241 A | 3/2009 |
| JP | 2000201524 A | 7/2000 |
| WO | 2012097933 A1 | 7/2012 |

OTHER PUBLICATIONS

Intellectual Property Office, International Search Report for UK Patent Application No. GB 1221347.6, dated Feb. 26, 2013.

\* cited by examiner

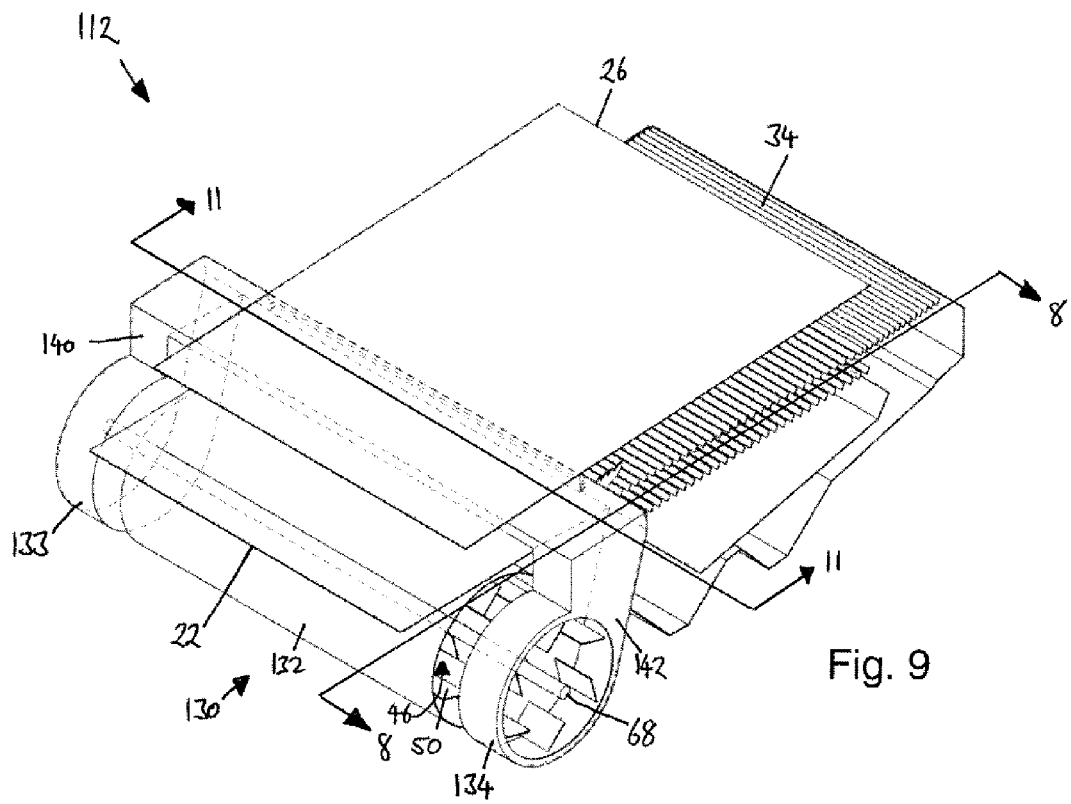
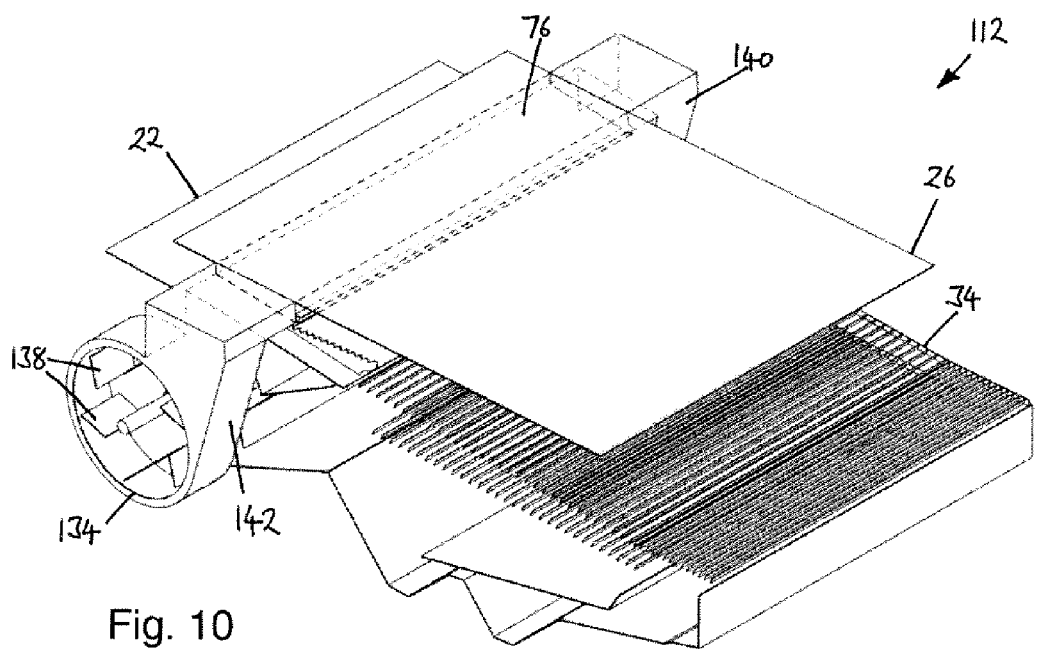

US 9,717,183 B2

GRAIN CLEANING UNIT WITH CLEANING AIRSTREAM VENTED ABOVE GRAIN PAN FOR A COMBINE HARVESTER

FIELD OF THE INVENTION

The invention relates to the processing of a crop stream in a combine harvester and more particularly to the processing and cleaning of grain separated by threshing apparatus.

BACKGROUND

For many decades, self-propelled combine harvesters have been used by farmers to harvest a wide range of crops including cereals, maize and oil-seed rape. Typically, a combine harvester cuts the crop material, threshes the grain therefrom, separates the grain from the straw, and cleans the grain before storing in an on-board tank. Straw and crop residue is ejected from the rear of the machine.

Threshing is typically carried out by one or more threshing cylinders which rotate within a drum or cage. Combines of the conventional or hybrid threshing type comprise a threshing cylinder which rotates on a transverse axis wherein the crop material passes tangentially under the cylinder. An axial-type threshing system includes one or more rotors having longitudinally-aligned rotation axes wherein the crop material is fed into a front end and is conveyed in a spiral path around the rotors. Combines having a transverse threshing system include a threshing cylinder having a transverse rotation axis wherein the crop material is fed tangentially at one side and is conveyed in a spiral path around the rotor across the width of the machine.

Grain and chaff separated in the threshing process falls under gravity through a grate onto an underlying conveyance system that passes the grain and chaff to a cleaning unit. The conveyance system typically includes a grain pan which is driven in an oscillating manner to convey the grain and chaff rearwardly to a rear edge from where the grain and chaff falls under gravity into the cleaning unit (often termed 'cleaning shoe').

The remainder of the crop stream from the threshing process is conveyed rearwardly from the threshing apparatus into separating apparatus. In a conventional system the separating apparatus typically includes a plurality of straw walkers which 'walk' the straw over a grate to the rear of the machine while the separated grain falls through the grate. In pure axial systems the separating apparatus comprises an extension of the one or more axial rotors wherein the separated material falls through a grate provided by the rotor cages.

The material falling through the grates of the separating apparatus is caught by an underlying separator pan (or 'return pan') which is also driven in an oscillating manner to convey the material forwardly to a front edge from where it falls under gravity to combine with the grain collected from the threshing apparatus. The straw by-product from the separating apparatus is ejected from the rear of the combine.

The cleaning unit of most combines operates according to a well-established process in which grain and chaff cascading down from the thresher and separator pans is subjected to an airstream created by a fan. The airstream blows the lighter chaff and dust rearwardly and out of the combine whilst the heavier grain falls onto and through a chaffer and one or more cleaning sieves before being conveyed to the grain tank.

The speed of the airflow is chosen so as to maximise the percentage of chaff, and indeed any material other than grain (MOG), removed from the crop-stream whilst minimising the percentage grain loss from the rear of the machine.

Developments in threshing and separating technology of recent years have not been matched by an increase in capacity of the cleaning unit. The bottleneck presented by the cleaning unit therefore inhibits utilisation of the full potential of modern separating technology.

SUMMARY OF INVENTION

It is an object of the invention to provide an improved grain cleaning apparatus in a combine harvester to increase the efficiency and/or capacity of the cleaning unit.

In accordance with the invention there is provided a combine harvester comprising threshing apparatus, a grain pan and a cleaning unit, the grain pan arranged to catch a grain/chaff stream falling under gravity from the threshing apparatus and being driven in an oscillating manner to convey the collected grain/chaff stream rearwardly to a rear edge from where the grain/chaff stream falls under gravity into the cleaning unit, the cleaning unit comprising a fan unit for generating a first cleaning airstream which is directed under the grain pan and through the grain/chaff stream falling from said rear edge, the combine harvester further comprising means to generate a second cleaning airstream which is vented above the grain pan.

By providing a second cleaning airstream upstream of the cleaning unit, the grain/MOG mixture is effectively precleaned wherein lighter MOG is blown rearwardly as the material falls under gravity on its journey from the threshing/separating apparatus to the cleaning unit.

The invention involves the recognition that the crop material conveyed rearwardly along the grain pan stratifies to a certain extent wherein the heavier grain settles into a lower layer adjacent the grain pan whilst the lighter/larger MOG rises to the top. A second cleaning air stream injected above the grain pan affects only the top layer of MOG whereas the bottom layer of grain is shielded and, therefore, has a greater opportunity to settle on a chaffer (course sieve) of a downstream cleaning unit.

It should be understood that the terms "grain pan", "thresher pan" and "stratification pan" shall be used interchangeably in the description hereinafter and shall refer to an oscillating pan which catches grain and MOG from threshing and/or separating apparatus disposed above. Similarly, the terms "return pan" and "separator pan" shall be used interchangeably and will refer to a pan which catches material from separating apparatus disposed above and conveys the material in a forward direction.

The second cleaning air stream may be generated by a number of different means. To avoid complex additional components, the fan unit preferably generates the second cleaning air stream by a modified construction. As in known combines, the fan unit may comprise a plurality of impeller blades mounted to a transverse orientated fan shaft and which rotates within a fan housing located under the grain pan, and wherein a first duct conveys the first cleaning air stream from a central portion of the fan housing under the rear edge of the grain pan. The first cleaning air stream is therefore passed through the cleaning shoe both above and below the chaffer so as to propel MOG rearwardly towards the rear edges of the chaffer.

In a first preferred embodiment, the impeller blades and fan housing are extended beyond the width of the grain pan, and at least one further duct conveys the second cleaning air stream from an end region of the fan housing around the grain pan. In effect, the existing fan is extended transversely and additional ducts are provided at each radial end region to collect the second cleaning air stream and direct it to a nozzle or otherwise disposed above the grain pan.

In a second preferred embodiment the impeller blades and fan housing reside within the width of the grain pan to provide a main fan and the fan unit further comprises at least one additional fan which generates said second cleaning air stream. In this case, each additional fan has a housing and set of impellers separate from those of the main fan. Each additional fan may comprise impeller blades which reside outside the width of the grain pan. Such impeller blades may share a common fan shaft with the main fan and, as such, are driven together. Alternatively, each additional fan may be driven independently from the main fan to allow separate adjustment of the first and second cleaning air streams to optimise the performance of the grain cleaning apparatus.

In a preferred arrangement the fan unit generates the second cleaning air stream in two portions from both ends thereof, and wherein the two portions are conveyed via respective ducts around the sides of the grain pan.

Although the invention is applicable to any grain cleaning apparatus in a combine harvester having a grain (or stratification) pan, it lends itself particularly well to the construction disclosed by co-pending international patent application published as WO2012/095239 in which an extended return pan overlaps the stratification pan resulting in the grain/MOG stream conveyed by the former falling onto the latter. Stratification of the two combined grain/MOG streams is of significant benefit to the performance of the cleaning unit. The injection, or venting, of a second cleaning air stream above the stratification pan in accordance with the invention and having an extended return pan, therefore, delivers synergistic benefit.

In such a construction the second cleaning air stream is preferably vented into a region above the grain pan through one or more vents. Such vents may be secured to the underside of the separator pan and connected by a flexible duct. Advantageously, the return pan presents a convenient structure to mount an air nozzle for distribution of a uniform air stream above the grain pan. Alternatively one or more vents may be fixed in position below the grain pan and spaced therefrom to avoid interference with the oscillating motion.

Preferably a plurality of upstanding fins are secured to the grain pan adjacent the rear edge to lift lighter material, especially straw, within the grain/MOG stream away from the heavier material (namely grain) and enhance stratification thereof. Each fin may include a saw-toothed top edge to enhance the lifting effect thereof. Furthermore, said plurality of fins may be spaced from one another in a single row across the width of the grain pan. By encouraging lifting of the lighter and/or larger MOG the second cleaning air stream has a greater separating effect.

The second cleaning airstream may be vented above the level of the return pan so as to convey the lighter MOG rearward and over the rear edge of the return pan. Advantageously, this pre-cleaning mechanism delivers a cleaner sample to the stratification pan and improves the capacity and performance of the cleaning shoe.

BRIEF DESCRIPTION OF DRAWINGS

Further advantages of the invention will become apparent from reading the following description of specific embodiments with reference to the appended drawings in which:

FIG. 9 is a raised front perspective view of grain cleaning apparatus in accordance with a second embodiment of the invention;

FIG. 10 is a raised rear perspective view of the grain cleaning apparatus of FIG. 9;

DESCRIPTION OF SPECIFIC EMBODIMENTS

Figure 1:
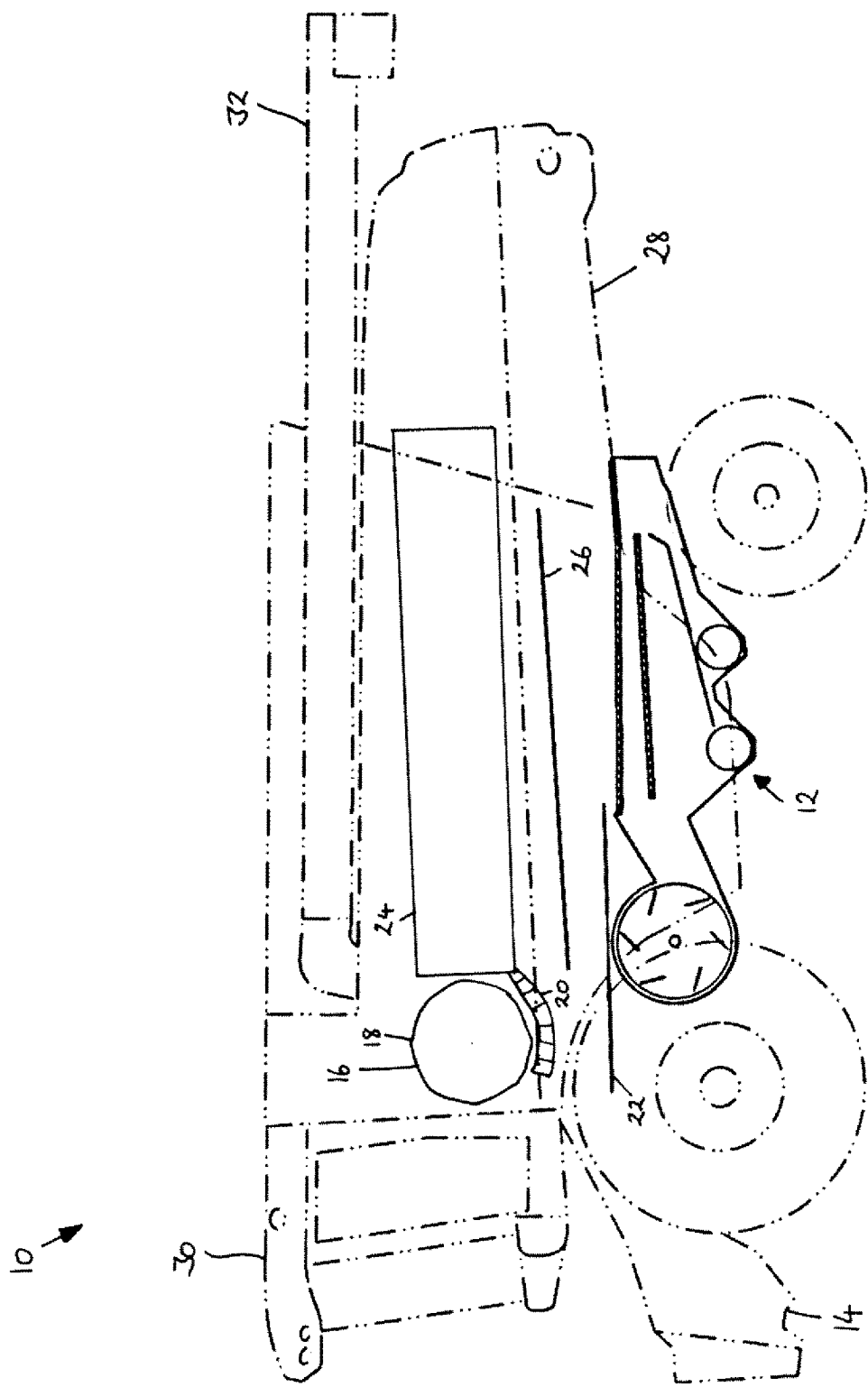
FIG. 1 is a side elevation of a combine harvester embodying grain cleaning apparatus, the combine harvester being shown in ghost form with the grain cleaning apparatus shown with solid lines.

With reference to FIG. 1 a combine harvester 10 is shown in ghost form whilst the grain cleaning apparatus 12 embodied therein is shown with solid lines. Combine 10 includes a front elevator housing 14 at the front of the machine for attachment of a header (not shown). The header when attached serves to cut and collect the crop material as it progresses across the field, the collected crop stream being conveyed up through the elevator housing 14 into a threshing unit which is represented schematically at 16. The threshing unit 16 includes a rotating cylinder 18 and a concave-shaped grate 20. The cylinder 18 rotates on a transverse axis and includes rasp bars (not shown) which act upon the crop stream to thresh the grain or seeds from the remaining material, the majority of the threshed grain passing through the underlying grate 20 and onto a grain pan 22.

The remainder of the crop material including straw, tailings and unthreshed grain are passed tangentially under the threshing cylinder 18 into separating apparatus represented at 24. The separating apparatus 24 may include a plurality of parallel, longitudinally-aligned, straw walkers (straw-walker combine). Alternatively, the separating apparatus 24 may include one or two longitudinally-aligned rotors which rotate on an longitudinal axis and convey the crop stream rearwardly in a ribbon passing along a spiral path (axial or hybrid combine). In both cases the separating apparatus serve to separate further grain from the crop stream which passes through a grate-like structure onto an underlying return pan 26. The residue crop material, predominantly made up of straw, exits the machine at the rear 28. Although not shown in FIG. 1, a straw spreader and/or chopper may be provided to process the straw material as required.

For completeness, the combine 10 includes a driver's cab 30 and an unloading auger 32, shown in the transport position in FIG. 1.

The threshing and separating apparatus do not remove all MOG from the grain and the crop stream collected by the grain pan 22 and return pan 26 typically includes a proportion of straw, chaff, tailings and other unwanted material such as weed seeds, bugs, and tree twigs. A grain cleaning unit is provided to remove this unwanted material thus leaving a clean sample of grain to be delivered to the tank.

For clarity, the term 'grain cleaning apparatus' used hereinafter is intended to include the grain pan, the return pan and the cleaning unit comprising the fan unit, chaffer and sieve(s).

Figure 2:
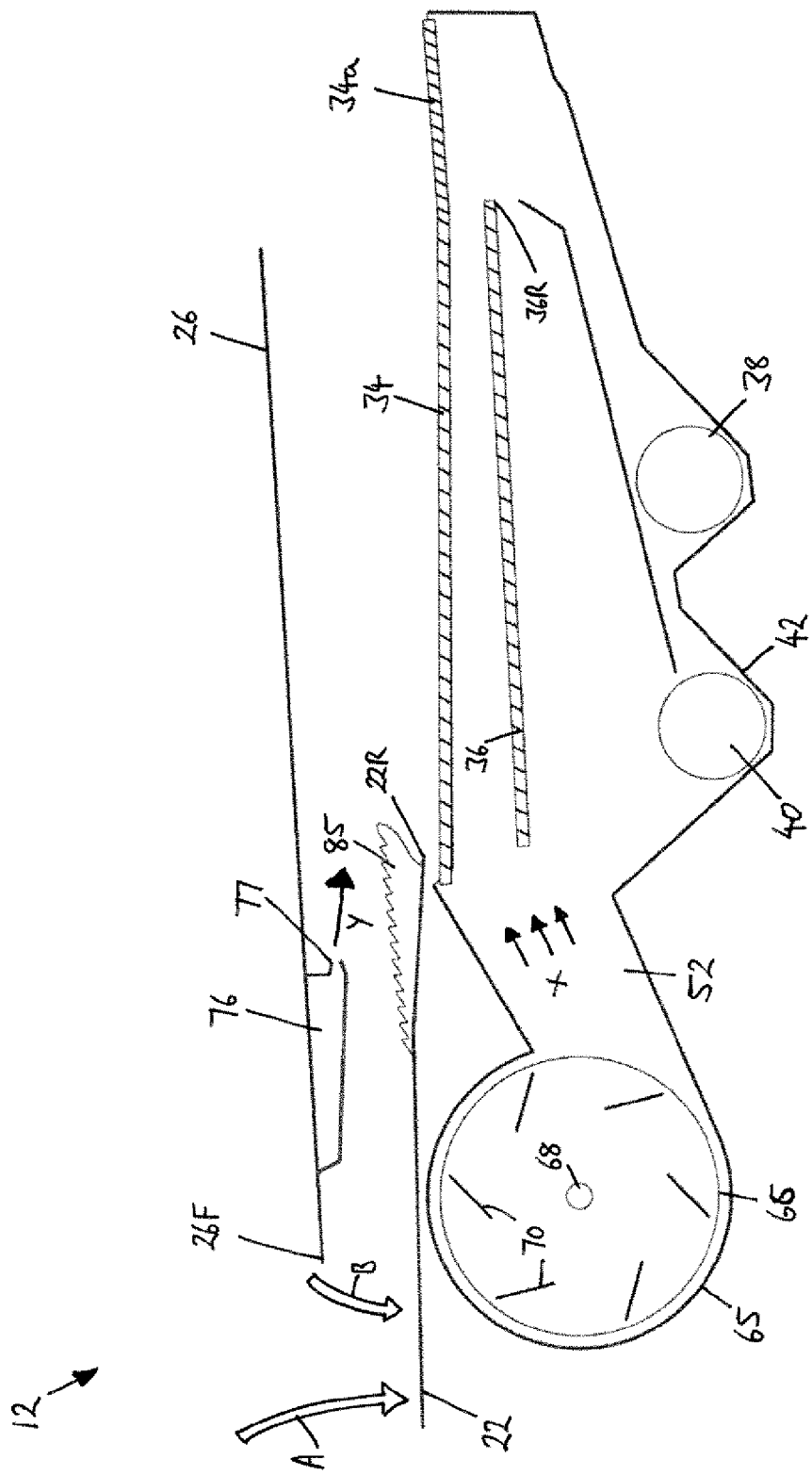
FIG. 2 shows a vertical section taken along the line 2-2 shown in FIG. 6.
Figure 3:
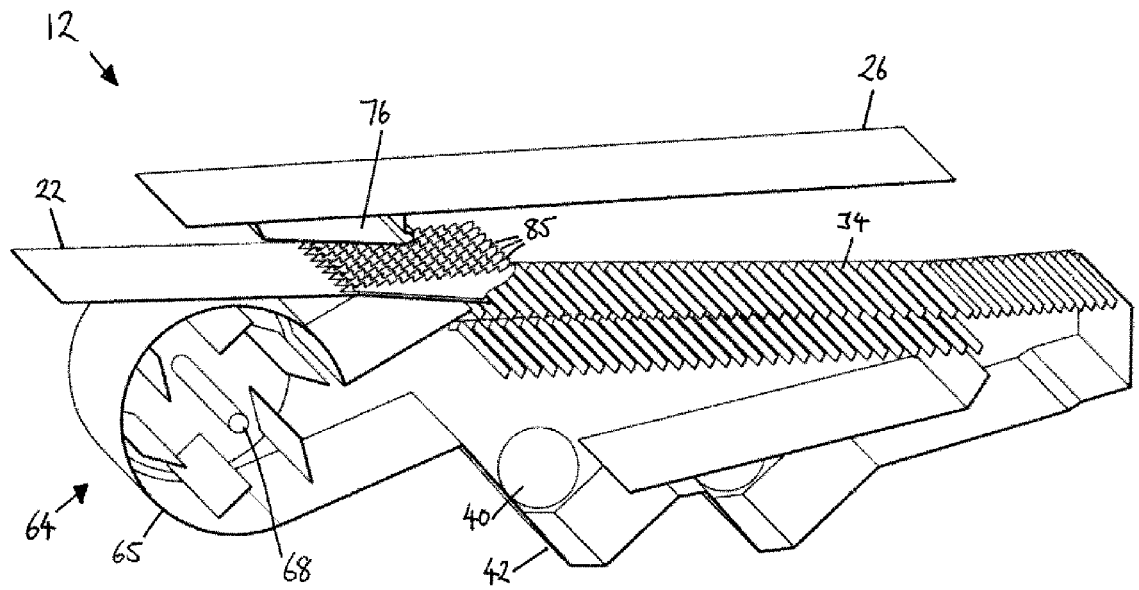
FIG. 3 is a raised front perspective view of the grain cleaning apparatus of FIG. 6 cut away along the line 2-2.
Figure 4:
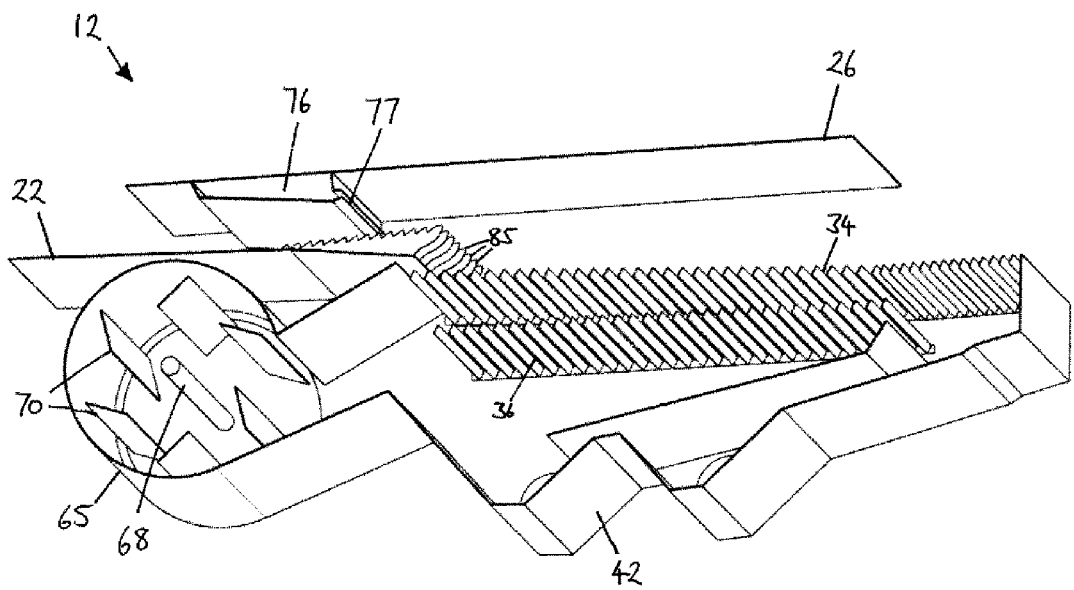
FIG. 4 is a lowered rear perspective view of the grain cleaning apparatus of FIG. 6 cut away along the line 2-2.
Figure 5:
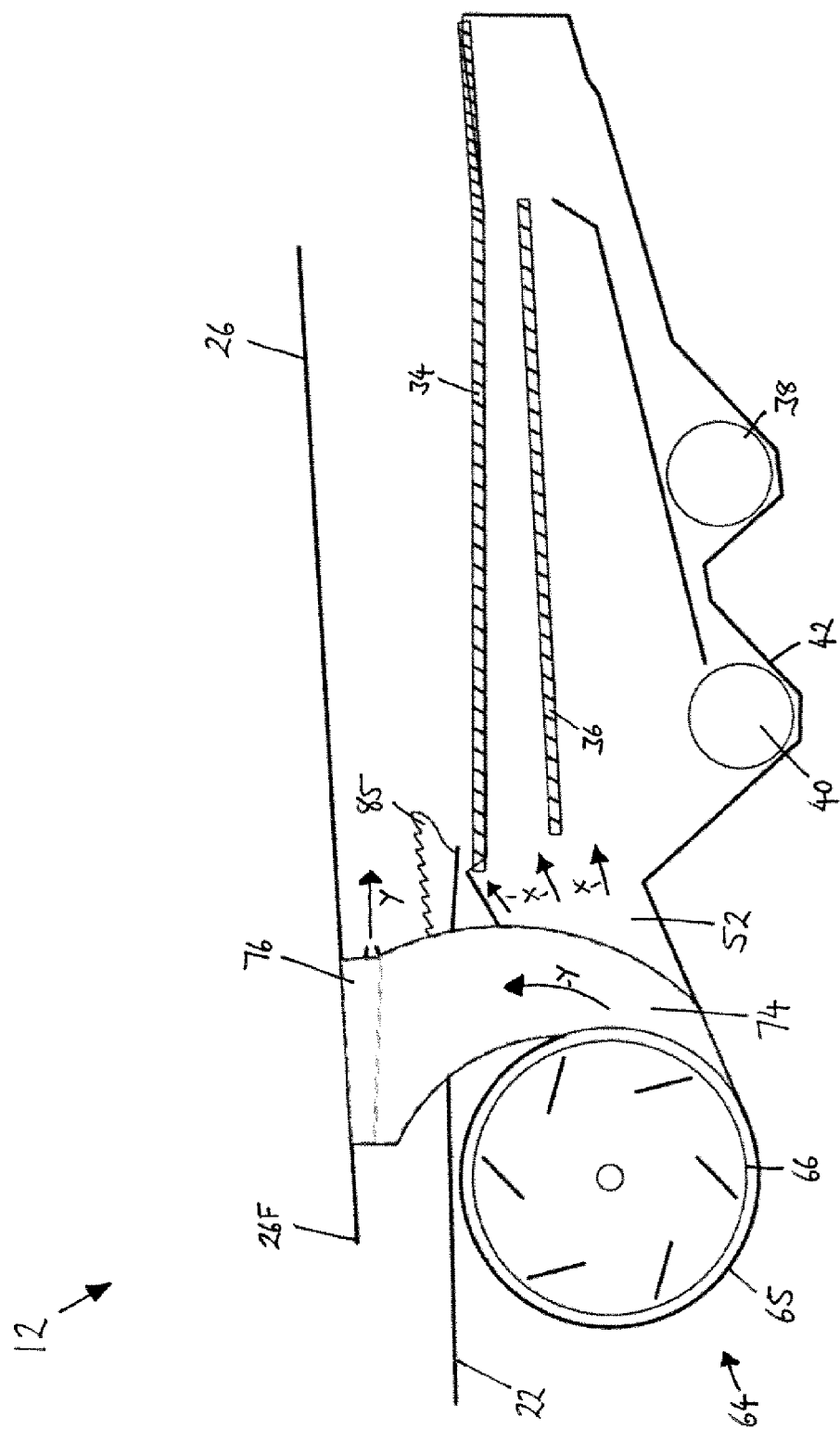
FIG. 5 is sectional view of grain cleaning apparatus of FIG. 6 taken along the line 5-5.

Turning to the detail of the grain cleaning apparatus 12, shown in FIGS. 2, 3 and 4, the grain pan 22 and return pan 26 are driven in an oscillating manner as in known machines to convey the grain and MOG accordingly. Although the drive and mounting mechanisms for the grain pan 22 and return pan 26 are not shown, it should be appreciated that this aspect is well known in the art of combine harvesters and is not critical to disclosure of the invention. Furthermore, it should be appreciated that the two pans 22, 26 may take a ridged construction as is know in the art and also appreciate that FIGS. 2-4 show the grain cleaning apparatus 12 in simplistic form.

In an alternative non-illustrated construction, the return pan may be replaced by a non-oscillating conveyor, for example comprising a continuous belt arrangement which catches and conveys the grain and MOG in a forward direction.

Turning back to the Figures, as mentioned above, grain and MOG passing through concave grate 20 falls onto the front of grain pan 22 indicated by arrow A in FIG. 2. This material is conveyed rearwardly (in the direction of arrow R in FIG. 2) by the oscillating motion of the grain pan and the ridged construction thereof.

Material passing through the grate of separator apparatus 24 falls onto the return pan 26 and is conveyed forwardly by the oscillating motion and ridged construction thereof. When the material reaches the front edge 26F of return pan 26 it falls onto the grain pan 22 and on top of the material conveyed from the threshing unit 16 and as indicated by arrow B. This conveyance and combination of two crop streams upstream of the cleaning unit is disclosed in WO-2012/095239 to which reference is invited.

The oscillating motion of grain pan 22 conveys the combined crop streams rearwardly towards the rear edge 22R of grain pan 22. Whilst conveyed across the grain pan 22 the crop stream, including grain and MOG, undergoes stratification wherein the heavier grain sinks to the bottom layers adjacent grain pan 22 and the lighter/larger MOG rises to the top layers.

Upon reaching the rear edge 22R, the crop stream falls onto a chaffer 34 which is also driven in a fore-and-aft oscillating motion. The chaffer 34 is of a known construction and includes a series of transverse slats which create open channels or gaps therebetween. The chaffer slats are angled upwardly and rearwardly so as to encourage MOG rearwardly whilst allowing the heavier grain to pass through the chaffer onto an underlying sieve 36. The angle of the slats is adjustable to allow changing of the coarseness of the separating action to cater for different conditions and crops.

Chaffer 34 includes an inclined rear section 34a. MOG which reaches the rear section 34a either passes over the rear edge and out of the machine or through the associated grate before being conveyed to a returns auger 38 for rethreshing in a known manner. It should be appreciated that the majority of materials passing through the rear section 34a is, and is intended to be, unthreshed tailings.

Grain passing through chaffer 34 is incident on sieve 36 which is also driven in an oscillating manner and serves to remove tailings from the stream of grain before being conveyed to on-board tank (not shown) by grain collecting auger 40 which resides in a transverse trough 42 at the bottom of the cleaning unit 12. Tailings 'blocked' by sieve 36 are conveyed rearwardly by the oscillating motion thereof to a rear edge 36R from where the tailings are directed to the returns auger 38 for reprocessing in a known manner.

The grain cleaning apparatus 12 further comprises a fan unit 64 for generating a first cleaning air stream which is directed through the falling grain/MOG stream as it falls from edge 22R, and through the sieve 36 and chaffer 34. The fan unit 64 comprises a fan housing 65 which extends across the width of the combine 10 and beyond the width of grain pan 22. The fan housing 65 is cylindrical and is open at both ends to allow air to be drawn in from the environment.

The fan 66 resides within the fan housing 65 and comprises a transverse fan shaft 68 which supports a plurality of impeller blades 70 and operates on a centrifugal principal. Fan shaft 68 is driven in a known manner, typically by a belt and pulley system (not shown) taken its drive from the engine of the combine 10. The drive speed of the fan is adjustable by the operator. The fan 66 is shown to include six impeller blades in the drawings although it should be appreciated that more or less impeller blades may be employed.

The impellor blades 70 draw in air from the transverse ends open to the environment and generate an air stream directed through channel 52 in a generally rearward direction. The air stream (designated generally by arrows X) creates a pressure differential across the chaffer 34 and sieve 36 to encourage lighter MOG rearwardly and upwardly whilst allowing the grain to pass through the chaffer 34 and the sieve 36. Although not shown in FIG. 2, it should be appreciated that the air stream X also passes above chaffer 34 and below grain pan 22 thus acting upon the crop stream as it falls from the rear edge 22R of the grain pan 22.

With reference to FIGS. 2 to 7, the fan housing 65 includes an opening on its rear side which communicates with the duct 52. It should be understood that duct 52 does not extend across the full width of fan housing 65 and corresponds substantially to the width of the grain pan 22 and chaffer 34. The centrally-disposed duct 52 conveys the first cleaning air stream represented by arrows X in FIG. 2, the air stream being directed under the rear edge 22R of grain pan 22 and both above and below the chaffer 34. Such a cleaning air stream is common in grain cleaning apparatus of existing combine harvesters. In short, the first cleaning air stream propels chaff and lighter MOG rearwardly and out of the rear of the cleaning unit over the rear edge of chaffer 34.

Figure 6:
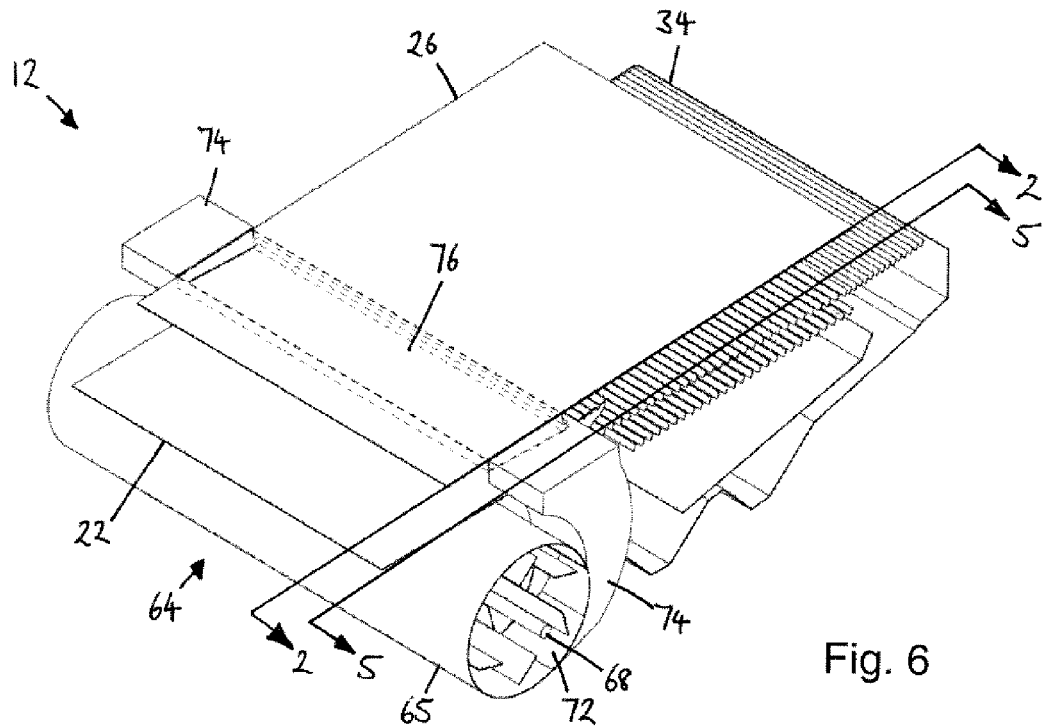
FIG. 6 is a raised front perspective view of grain cleaning apparatus in accordance with a first embodiment of the invention.
Figure 7:
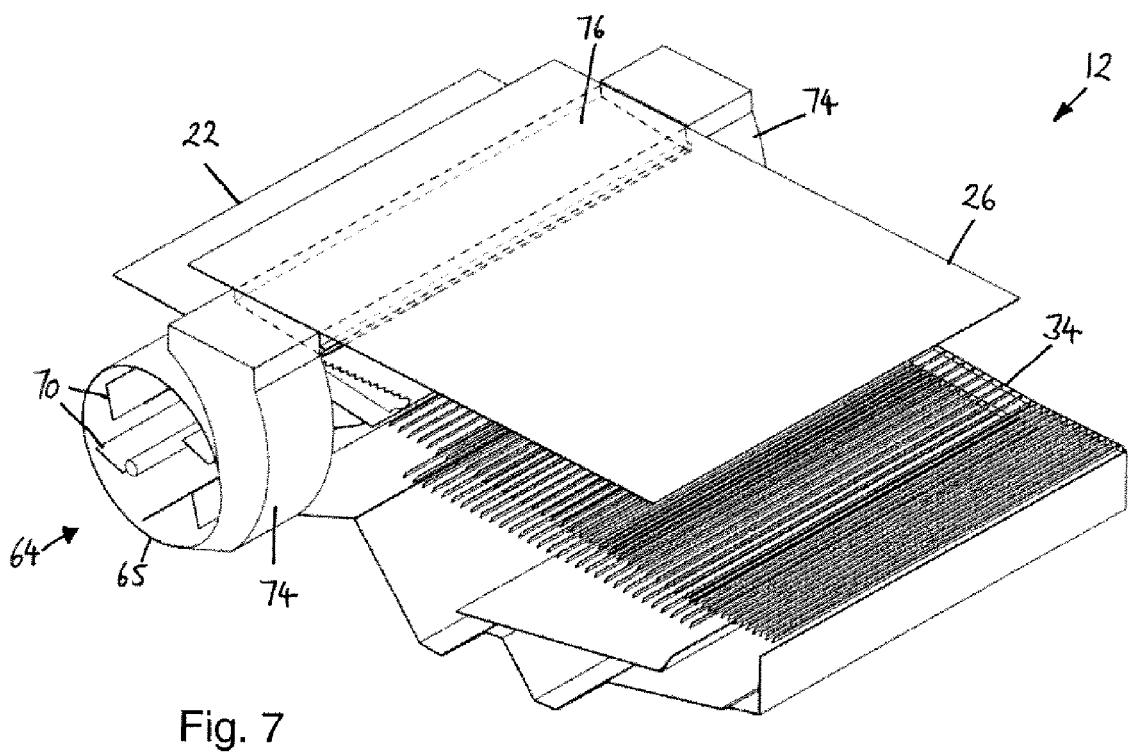
FIG. 7 is a raised rear perspective view of the grain cleaning apparatus of FIG. 6.
Figure 8:
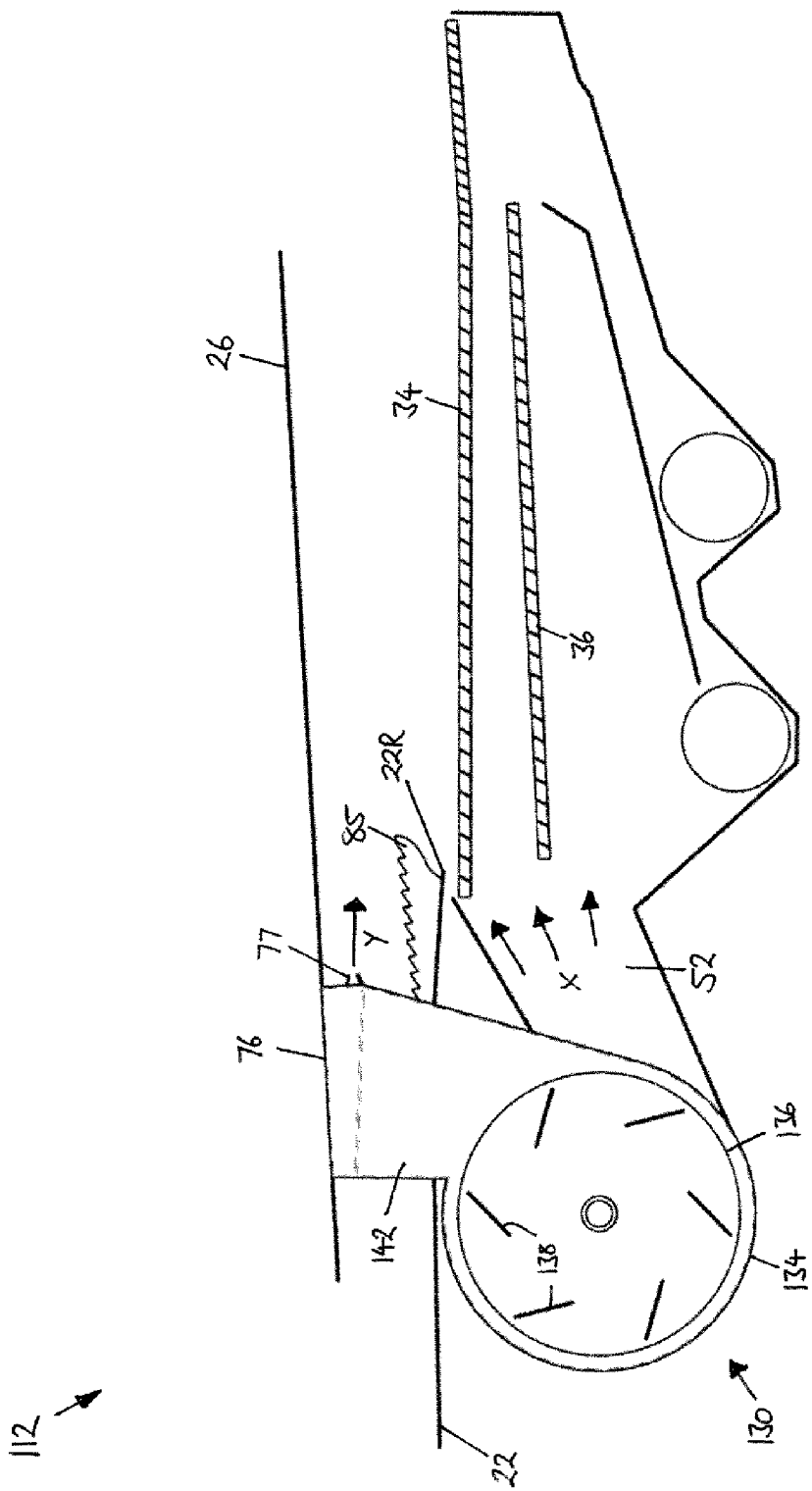
FIG. 8 is a vertical section taken along the line 8-8 of grain cleaning apparatus shown in FIG. 9.

The invention is concerned with the generation of a second cleaning air stream upstream of the chaffer and sieve assembly. With particular reference to FIG. 6, the fan housing 65 includes a pair of subsidiary vents 72, one at each end, which each communicate with secondary ducts 74. Each secondary duct conveys a respective portion of a second cleaning air stream 'Y' away from the fan housing 65, up and around the sides of grain pan 22 and into respective ends of a transverse air nozzle 76 which is secured to the underside of separator pan 26. The transverse air nozzle 76 includes a rearward-directed vent 77 in the form of a slot through which the second cleaning air stream Y is vented above the grain pan 22. The passage of second air stream Y is shown diagrammatically by arrows Y in FIG. 5.

The second air stream serves to engage the lighter and larger MOG which tends to reside in the upper stratified layers of material present on grain pan 22. This lighter crop residue is thereby propelled rearwardly away from the rear edge of grain pan 22 and thus improves the efficiency of the chaffer 34.

A plurality of fins (or ramps) 85 having a saw-toothed upper edge are provided in a row across the rear of grain pan 22. The fins 85 serve to lift the lighter and larger MOG away from the lower layers of grain so as to encourage engagement with the second air stream Y. It should be appreciated however that the fins 85 may be omitted from the construction whilst remaining within the scope of the present invention.

The secondary ducts 74 may be secured to the respective ends of transverse air nozzle 76 by flexible ducts which permits sufficient movement of the air nozzle 76 as the separator pan oscillates in use. Such flexible ducts or pipes may be formed from rubber or cloth for example and be secured between the secondary ducts 74 and the nozzle 76 by means of jubilee clips for example.

FIGS. 8 to 11 illustrate a second embodiment of the invention in which the second cleaning air stream Y is generated by dedicated additional fans separate from that which generates the first cleaning air stream. Like reference numerals will be applied to those features which are common between the two embodiments.

Grain cleaning apparatus 112 includes a fan unit 130 having a central fan housing 132 and two auxiliary fan housings 133,134 sharing the same axis as central housing 132 but separated therefrom by a respective gap 144. Central fan housing 132 houses a main fan 46 having a fan shaft 68 and impeller blades 50 driven thereby. Central fan housing 132 includes an opening on its rear side which is communication with a central duct 52 having a similar construction to that described with reference to FIGS. 2 to 7 above. Main fan 46 serves to generate a first cleaning air stream X which is directed under the rear edge 22R of grain pan 22 as above.

Each auxiliary fan housing 133, 134 houses a respective additional fan 136 (see FIG. 8) which each include a respective set of impeller blades 138 supported on and driven by fan shaft 68. Each auxiliary fan housing 133,134 includes an opening along its rear upper quadrant which is in communication with secondary vents 140,142 which each convey a respective portion of the second cleaning air stream Y to the transverse air nozzle 76. The respective portions of second cleaning air stream Y combine inside the transverse air nozzle 76 which is pressurised so as to propel air stream Y through a transverse gap slit.

Figure 11:
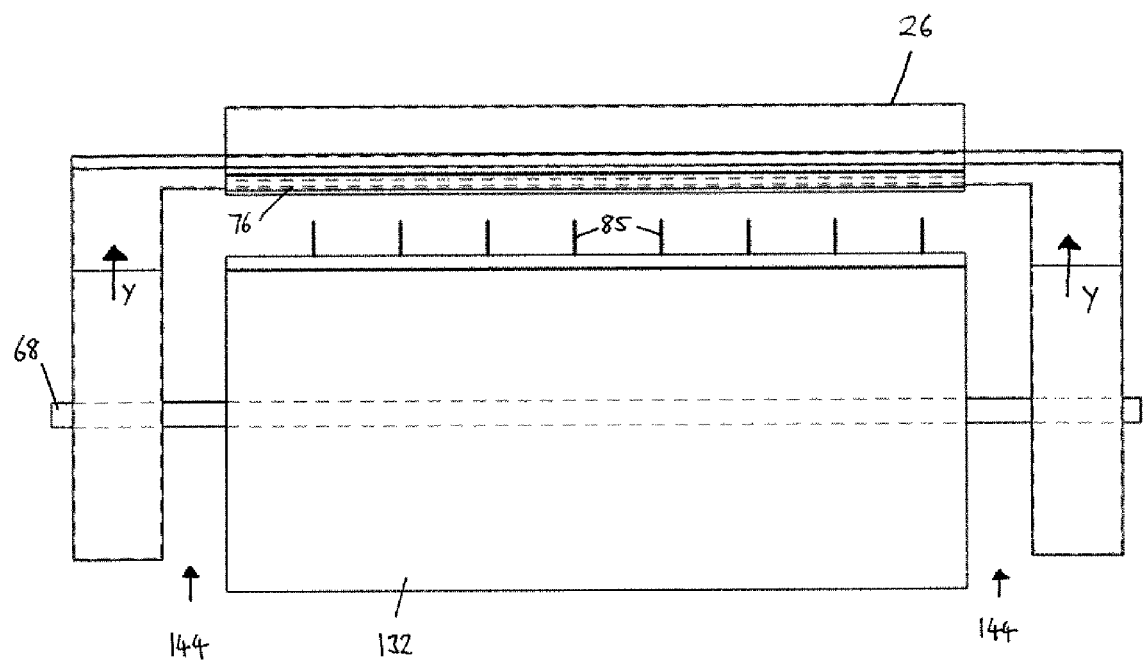
FIG. 11 is a vertical section taken along the line 11-11 of the grain cleaning apparatus shown in FIG. 9; and, FIG. 12 is a raised front perspective view of grain cleaning apparatus in accordance with a third embodiment of the invention.

Air is drawn in to the central housing 132 and auxiliary housings 133,134 through gaps 144 shown in FIG. 11. Furthermore, the auxiliary fan housings 133,134 are also open at their outside ends through which additional ambient air may be drawn.

The above described embodiments each generate a first cleaning air stream X and a second air stream Y by means of a fan unit 64, 130. The respective air streams in both of these examples are not controllable independently. However, it is envisaged that the second embodiment described in relation to FIGS. 8 to 11 may include dedicated fan shafts for each of the additional fans. Advantageously, this would permit independent control of the magnitude of the first and second cleaning air streams.

Figure 12:
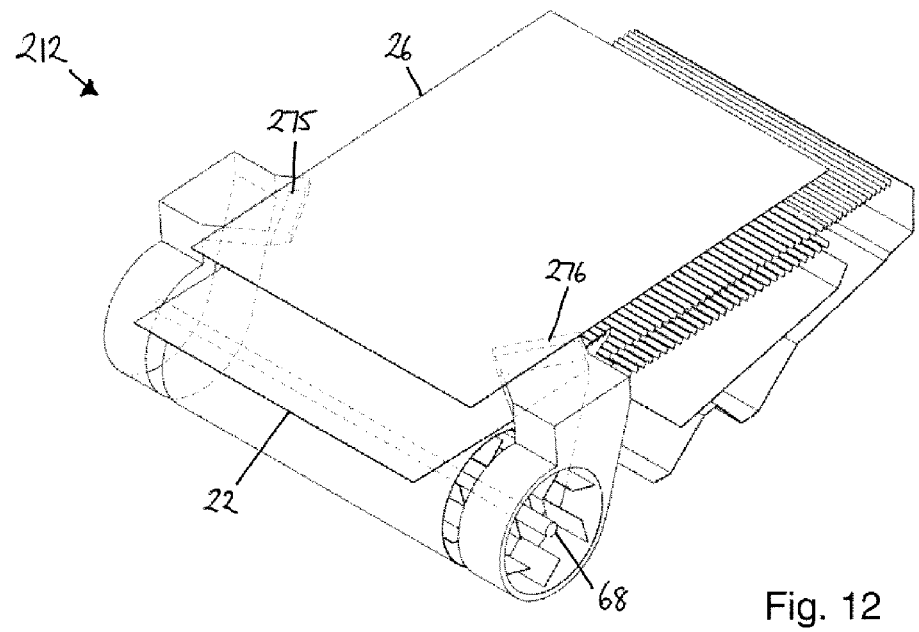

FIG. 12 illustrates a third embodiment of the invention in which the second cleaning air stream Y of grain cleaning apparatus 212 is directed into the volume above the grain pan 22 by a pair of air nozzles 275, 276 which are mounted independently of the separator pan 26. Advantageously, the air nozzles 275, 276 are not subject to the vigorous oscillation of the separator pan 26 and, therefore, do not require a flexible connection to the source. The nozzles 275, 276 are spaced with sufficient clearance from the separator pan 26 and grain pan 22 so as not to interfere with the operation thereof.

The nozzles 275, 276 are angled so that the two air streams combine to create a generally linear airflow across the top of the grain pan 22 in a generally rearward direction.

In summary there is provided a combine harvester comprising threshing apparatus, a grain pan and a cleaning unit. The grain pan is arranged to collect a grain/chaff stream from the threshing apparatus and is driven in an oscillating manner to convey the collected grain/chaff stream rearwardly to a rear edge from where the grain/chaff stream falls under gravity into the cleaning unit. The cleaning unit comprises a fan unit for generating a first cleaning airstream which is directed under the grain pan and through the grain/chaff stream falling from said rear edge. The combine harvester further comprises means to generate a second cleaning airstream directed over the grain pan.

The invention claimed is:

1. A combine harvester comprising threshing apparatus, grain separating apparatus, a return conveyor, a grain pan and a cleaning unit, the grain pan arranged to catch a grain/chaff stream falling from the threshing apparatus and being driven in an oscillating manner to convey the collected grain/chaff stream rearwardly to a rear edge from where the grain/chaff stream falls into the cleaning unit, the return conveyor located underneath the separating apparatus and serving to convey a secondary grain/chaff stream forward to a front edge from where the secondary grain/chaff stream falls onto the grain pan, the cleaning unit comprising a fan unit for generating a first cleaning airstream which is directed under the grain pan and through the grain/chaff stream falling from said rear edge, the combine harvester further comprising means to generate a second cleaning airstream which is vented above the grain pan through one or more vents secured to the underside of the return conveyor.

2. A combine harvester according to claim 1, wherein said fan unit generates said second cleaning airstream.

3. A combine harvester according to claim 2, wherein the fan unit comprises a plurality of impellor blades mounted to a transverse-orientated fan shaft and rotates within a fan housing located under the grain pan, and wherein a first duct conveys the first cleaning airstream from a central portion of the fan housing under the rear edge of the grain pan.

4. A combine harvester according to claim 3, wherein the impellor blades and fan housing extend beyond the width of the grain pan, and at least one further duct conveys the second cleaning airstream from an end region of the fan housing around the grain pan.

5. A combine harvester according to claim 3, wherein the impellor blades and fan housing reside within the width of the grain pan to provide a main fan, and the fan unit comprises at least one additional fan which is separate from the main fan and which generates said second cleaning airstream.

6. A combine harvester according to claim 5, wherein the at least one additional fan comprises impellor blades residing outside of the width of the grain pan.

7. A combine harvester according to claim 6, wherein the impellor blades of the main fan and the at least one additional fan share a common fan shaft.

8. A combine harvester according to claim 2, wherein the fan unit generates said second cleaning airstream in two portions from both ends thereof, and wherein the two portions are conveyed via respective ducts around the sides of the grain pan.

9. A combine harvester according to claim 1, wherein the threshing apparatus comprises a threshing unit arranged to receive and thresh a crop stream, wherein the separating apparatus is located downstream and rearward of the threshing unit and arranged to receive the threshed crop stream and convey in a rearward direction, both the threshing unit and separating apparatus comprising respective grates for allowing grain and chaff to fall onto the grain pan and the return conveyor respectively, wherein the return conveyor provides a ceiling to a passage through which the second cleaning airstream passes.

10. A combine harvester according to claim 1, wherein a plurality of upstanding fins are secured to the grain pan adjacent the rear edge to lift lighter material within the grain/chaff stream away from the heavier material and enhance stratification thereof.

11. A combine harvester according to claim 10, wherein each fin includes a saw-toothed top edge.

12. A combine harvester according to claim 10, wherein said plurality of fins are spaced from one another in a row across the width of the grain pan.

13. A combine harvester comprising threshing apparatus, a grain pan and a cleaning unit, the grain pan arranged to catch a grain/chaff stream falling from the threshing apparatus and being driven in an oscillating manner to convey the collected grain/chaff stream rearwardly to a rear edge from where the grain/chaff stream falls into the cleaning unit, the cleaning unit comprising a fan unit for generating a first cleaning airstream which is directed under the grain pan and through the grain/chaff stream falling from said rear edge and a second cleaning airstream which is vented above the grain pan, wherein the fan unit generates said second cleaning airstream in two portions from both ends thereof, and wherein the two portions are conveyed via respective ducts around the sides of the grain pan, the combine harvester further comprising grain separating apparatus, and a return conveyor located underneath the separating apparatus and serving to convey a secondary grain/chaff stream forward to a front edge from where the secondary grain/chaff stream falls onto the grain pan, wherein the second cleaning airstream is vented through one or more vents secured to the underside of the return conveyor.

* * * * *